United States Patent [19]
Fujita

[11] Patent Number: 5,940,205
[45] Date of Patent: Aug. 17, 1999

[54] CHANNEL COUNTER AND METHOD OF CONTROLLING AN OPTICAL OUTPUT LEVEL WITH SAME

[75] Inventor: Masayuki Fujita, Tokyo, Japan

[73] Assignee: NEC Corporation, Tokyo, Japan

[21] Appl. No.: 08/996,291

[22] Filed: Dec. 22, 1997

[30] Foreign Application Priority Data

Dec. 27, 1996 [JP] Japan .................................. 8-350301

[51] Int. Cl.⁶ .............................. G02F 1/33; G02B 26/08
[52] U.S. Cl. ........................................... 359/305; 359/298
[58] Field of Search ................................. 359/305–314, 359/189, 193

[56] References Cited

U.S. PATENT DOCUMENTS 4,624,534 11/1986 Amano .................................... 359/310
5,144,467 9/1992 Kitajima et al. ........................ 359/124

Primary Examiner—Georgia Epps
Assistant Examiner—Suzanne Letendre
Attorney, Agent, or Firm—Whitham, Curtis & Whitham

[57] ABSTRACT

A channel counter that can count the number of given wavelength channels in a specific wavelength range in a simplified system. A channel counter comprises an acousto-optic deflector, an optical fiber for transmitting light to the acousto-optic deflector, an optical receiver for receiving light transmitted from the optical fiber and diffracted by the acousto-optic deflector, an oscillator for driving the acousto-optic deflector, a scanning circuit for time-scanning the oscillation frequency of the oscillator, and a count circuit for counting the number of peaks of an electric signal output from the optical receiver per scanning duration of the scanning circuit.

9 Claims, 4 Drawing Sheets

CHANNEL COUNTER AND METHOD OF CONTROLLING AN OPTICAL OUTPUT LEVEL WITH SAME

BACKGROUND OF THE INVENTION

The present invention relates to a control method by which an optical output level to be set by the number of channels of wavelength multiplexing signal light can be changed to suppress a variation in optical output level. More particularly, the present invention relates to a channel counter that checks for the number of wavelength multiplexing light channels to perform the above-mentioned control method.

Wavelength multiplexing transmission is the scheme of using signal light containing plural wavelengths in optical communications to expand the transmission capacity. This scheme requires optical multiplexing in the transmission section optical demultiplexing in the receiving section, so that loss occurs due to optical multiplexing and demultiplexing. In many cases, optical amplifiers are used to compensate the optical multiplexing and demultiplexing loss or the transmission path loss.

A semiconductor amplifier, a fiber Raman amplifier, a fiber Brillouin amplifier, or a rare-earth-element-doped-fiber amplifier is listed as an optical amplifier. Particularly, the erbium-doped-fiber amplifier (EDFA), or a type of rare-earth-element-doped-fiber amplifier, is often used because it has no polarization dependent characteristic and can be pumped by a semiconductor laser. The EDFA amplifier generally controls its optical output to a fixed level.

FIG. 3 is a block circuit diagram illustrating the configuration of an ordinary EDF amplifier. In this example, the optical branching coupler 13 inserted in the output portion of the EDF amplifier 12 partially branches wavelength multiplexing light. The photo diode (PD) module 15 converts the branched light into a current. The optical amplifier control circuit 16 controls the pumping laser module 14 to set the current to a constant value. Thus the optical output is controlled to a constant level.

However, a fixed number of signal light beams are not always transmitted in the wavelength multiplexing transmission. For example, provided that the optical output level to be set is 40 mW, when wavelength multiplexing signal light beams are input on four channels, the optical output per channel is 10 mW. When the wavelength multiplexing light beams on two channels are input, the optical output per channel is 20 mW. That is, the optical output level per channel depends on the number of channels of wavelength multiplexing signal light beams to be input.

In order to suppress changes in the optical output level, there is the control method in which the optical output level is varied to a set value according to the number of channels for wavelength multiplexing light. This control method requires a channel counter that checks for the number of channels for wavelength multiplexing light.

FIG. 4 is a block circuit diagram illustrating the configuration of an ordinary channel counter. In this example, an 1×4 optical branching coupler 17 divides wavelength multiplexing signal light input to the channel counter into four. Each optical filter module 18 extracts the signal light of each wavelength. Each photo diode (PD) module 15 converts each signal light into a current. The channel counter 19 counts the current.

However, since the above-mentioned prior art requires the optical branches, fiber gratings, and optical receivers, each corresponding to the channel number to be counted, the configuration of the optical circuit becomes complicated.

The prior art counter cannot count more than the number of channels corresponding to optical branches, thus it is not capable of dealing with an increasing number of channels.

Moreover, since the prior art counter can count only the signal light of the transparent wavelength of the optical filter, it cannot deal with a variation in layout of the wavelength on each channel.

SUMMARY OF THE INVENTION

The present invention is made to solve the above-mentioned problems. The objective of the present invention is to provide a channel counter that can count the number of given wavelength channels within a specific wavelength range in a simple system.

Another object of the present invention to provide a method of controlling an optical output level with a channel counter.

The objective of the present invention is achieved by a channel counter comprising an acousto-optic deflector, an optical fiber for transmitting light to the acousto-optic deflector, an optical receiver for receiving light transmitted from the optical fiber and diffracted by the acousto-optic deflector, an oscillator for driving the acousto-optic deflector, a scanning circuit for time-scanning the oscillation frequency of the oscillator, and a count circuit for counting the number of peaks of an electric signal output from the optical receiver per scanning duration of the scanning circuit.

According to the present invention, the acousto-optic deflector comprises a $PbMoO_4$ crystal.

According to the present invention, the acousto-optic deflector comprises a $TeO_2$ crystal.

Moreover according to the present invention, the acousto-optic deflector comprises a $LiNbO_3$ crystal.

According to the present invention, the acousto-optic deflector comprises an $As_2Se_3$ crystal.

According to the present invention, the oscillator comprises a voltage-controlled oscillator.

According to the present invention, a method of controlling an optical output level with a channel counter, comprises the steps of transmitting a wavelength multiplexing signal light of each of channels from an optical fiber to an acosto-optic deflector at a fixed incident angle, breaking up the wavelength multiplexing signal light into wavelength components as diffracted light by the acosto-optic deflector, receiving a wavelength component as diffracted light with a maximum power by an optical receiver, and counting the number of peaks contained in the wavelength component with the maximum power from the optical receiver to count the number of channels.

The method further comprises the step of periodically varying the refractive index of the acosto-optic deflector by applying an ac voltage to the acosto-optic deflector.

The method further comprises the step of satisfying a wavelength component corresponding to each channel contained in the wavelength multiplexing signal light with a Bragg condition so that the optical receiver produces its diffracted light with a maximum power.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, an embodiment of the present invention will be described below in detail with reference to the attached drawings.

Figure 1:
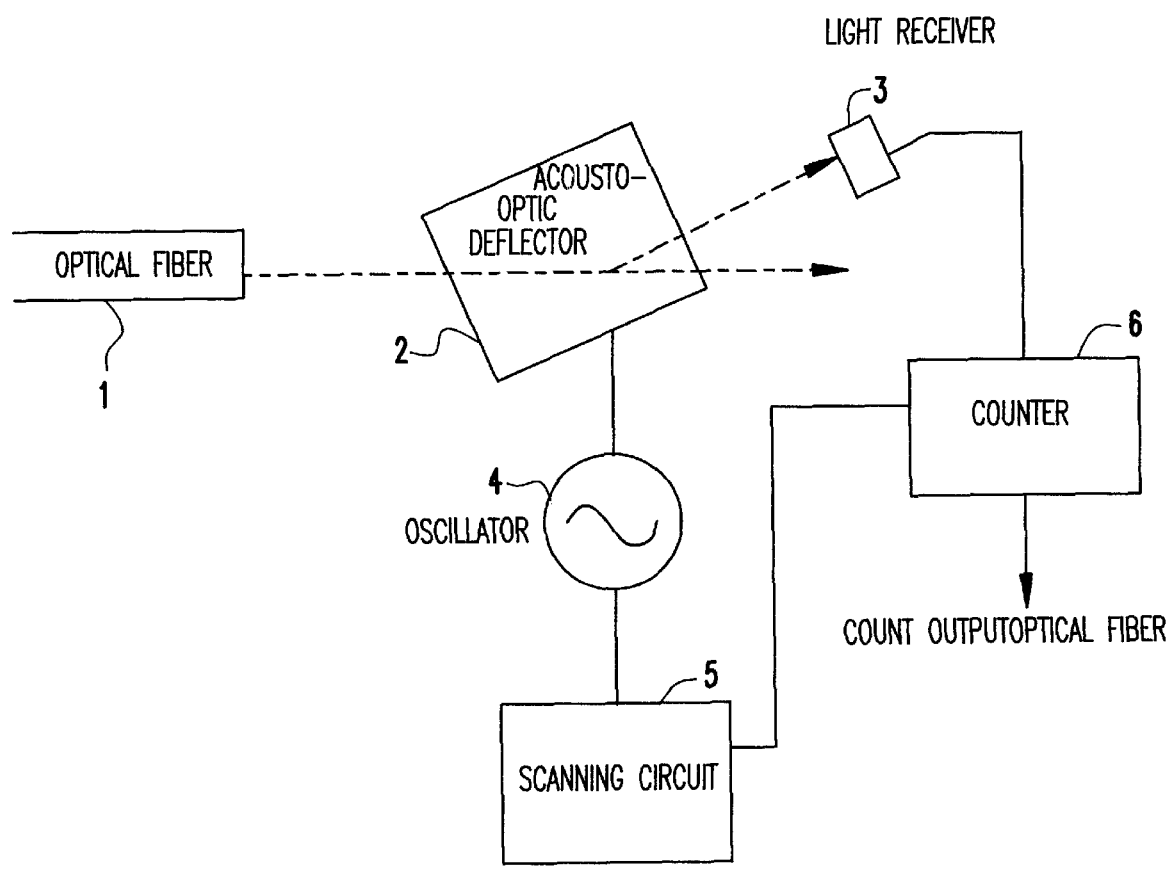
FIG. 1 is a block circuit diagram illustrating a channel counter according to an embodiment of the present invention.

FIG. 1 is a block circuit diagram illustrating the configuration of a channel counter according to an embodiment of the present invention.

Referring to FIG. 1, an optical fiber 1 emits light to an acousto-optic deflector 2. The acousto-optic deflector 2 diffracts the emitted light. The optical receiver 3 detects the diffracted light. The acousto-optic deflector 2 is driven by the oscillator 4. The scanning circuit 5 varies periodically the oscillation frequency of the oscillator 4. The counter circuit 6 receives the output signal from the optical receiver 3 and counts the number of peaks thereof. The count result of the counter circuit 6 is reset based on the synchronous signal from the scanning circuit 5 and is updated every time the scanning circuit 5 sweeps the oscillation frequency of the oscillator once.

When an ac voltage (drive voltage) is applied to the acousto-optic deflector 2, the refractive index of the acousto-optic deflector 2 varies periodically according to the frequency of the drive voltage. In this state, when light is emitted into the inside of the acousto-optic deflector 2, periodic changes in refractive index act as a grating, so that the light of a specific wavelength is reflected. The light changing its advance direction after reflection is referred to as diffracted light.

The ratio of the power of diffracted light to the power of incident light, that is, diffraction efficiency is substantially decided by incident angle $\theta$ of light to a wave surface on which the refractive index periodically varies inside the acousto-optic deflector 2, the wavelength $\lambda$ of incident light, and the frequency f of a drive voltage. The diffraction efficiency is maximized in the light of a wavelength satisfying the Bragg condition, $\lambda = 2v/f\sin\theta$ (where v is a travel velocity of an elastic wave inducing a refractive index period inside the acousto-optic deflector 2). The travel velocity v depends on the substance of the acousto-optic deflector 2. Hence, provided that the incident angle $\theta$ of light is constant, the wavelength of the light satisfying the Bragg condition to the frequency f of a drive voltage is principally decided. The light of the decided wavelength only becomes diffracted light.

In the channel counter, the optical receiver 3 is disposed in the middle of the path of the diffracted light emitted out of the acousto-optic deflector 2 after receiving light from the optical fiber 1 at a fixed incident angle. That is, the optical receiver 3 monitors the power level of diffracted light.

As the scanning circuit 5 varies the frequency of the oscillator 4 driven by the acousto-optic deflector 2, the wavelength $\lambda$ satisfying the Bragg condition varies. The wavelength component contained in incident light is extracted and then detected by the optical receiver 3. When the acousto-optic deflector 2 receives the wavelength multiplexing signal light, the optical receiver 3 emits its maximum power output, provided that the wavelength corresponding to each channel contained in the wavelength multiplexing signal satisfies the Bragg condition. Therefore the counter 6 can count the number of channels by counting the number of peaks or changes in time of the output signal, from the optical receiver 3.

Figure 2:
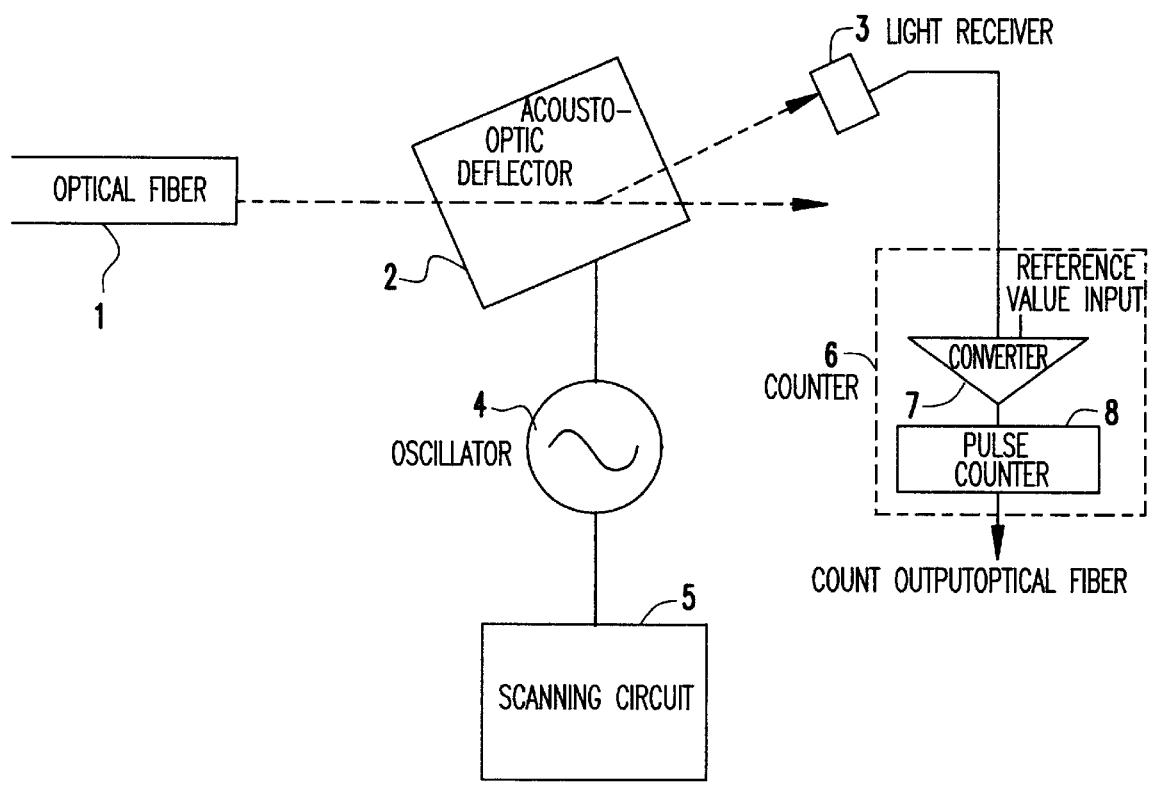
FIG. 2 is a block circuit diagram showing the configuration of a channel counter according to the present invention.
Figure 3:
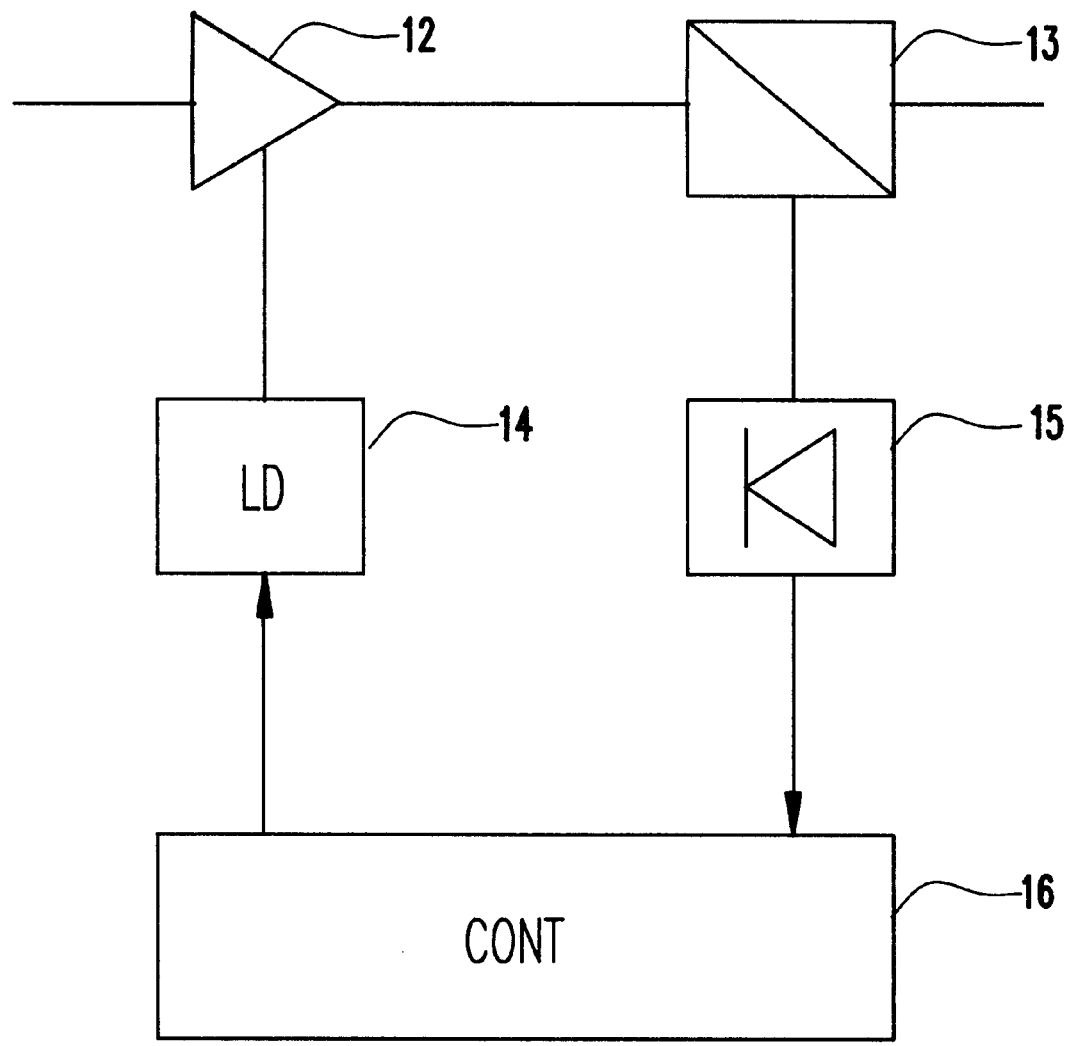
FIG. 3 is a block circuit diagram showing an ordinary optical amplifier control mode.
Figure 4:
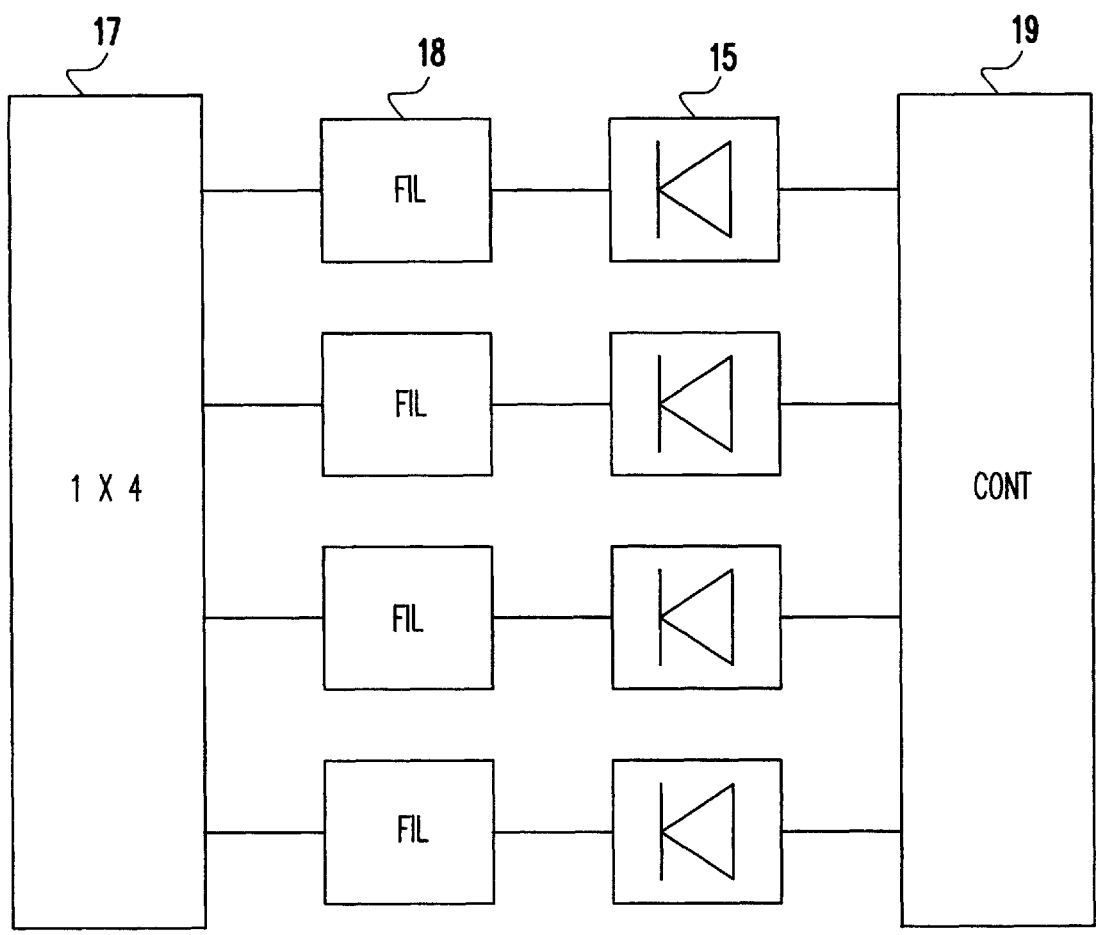
FIG. 4 is a block circuit diagram showing the configuration of an ordinary channel counter.

Either an ultrasonic transducer to which $PbMoO_4$ crystal, $TeO_2$ crystal, or $As_2Se_3$ is bonded, or an $LiNbO_3$ crystal substrate on which comb electrodes are formed can be used as the acousto-optic deflector. A PIN-PD can be used as the optical receiver 3. A single-mode optical fiber ordinarily used on an optical transmission path in a wavelength multiplexing optical transmission system can be used as the optical fiber 1. A voltage-controlled oscillator (VCO) that can vary its oscillation frequency by an externally-applied voltage can be used as the oscillator 4. The scanning circuit 5 outputs a triangular wave voltage to scan the oscillation frequency of the VCO. The counter 6, as shown in FIG. 2, is formed of a converter 7 and a pulse counter 8 that counts the output pulses from the converter 7. The reference value of the comparator 7 is preset to a value slightly smaller than the peak value output from the optical receiver 3. When the output-signal from the optical receiver 3 is at a value near to the peak value, the comparator outputs a single pulse. The count result of the counter 6 is reset by the synchronous signal from the sweep circuit 5.

According to the present invention, the optical circuit can be simplified because the configuration thereof does not depend on the number of all channels to be count.

The channel counter can flexibly deal with an increasing number of channels because the configuration the optical circuit does not depend on the number of all channels.

Moreover, according to the present invention, since any optical component that functions only to a specific wavelength is not used, the arrangement of the wavelength of each channel can be flexibly changed.

The entire disclosure of Japanese Patent Application No. 8-350301 filed on Dec. 27, 1996 including specification, claims, drawing and summary are incorporated herein by reference in its entirety.

What is claimed is:

1. A channel counter comprising:

an acousto-optic deflector;

an optical fiber for transmitting light comprising a number of multiplexed channels to said acousto-optic deflector;

an optical receiver for receiving light diffracted by said acousto-optic deflector and outputting an electrical signal;

an oscillator for driving said acousto-optic deflector;

a scanning circuit for time-scanning an oscillation frequency of said oscillator; and a count circuit for counting a number of peaks of said electric signal output from said optical receiver per scanning duration of said scanning circuit, said number of peaks corresponding to a number of multiplexed channels on said optical fiber.

2. The channel counter of claim 1, wherein said acousto-optic deflector comprises a $PbMoO_4$ crystal.

3. The channel counter of claim 1, wherein said acousto-optic deflector comprises a $TeO_2$ crystal.

4. The channel counter of claim 1, wherein said acousto-optic deflector comprises a $LiNbO_3$ crystal.

5. The channel counter of claim 1, wherein said acousto-optic deflector comprises an $As_2Se_3$ crystal.

6. The channel counter of claim 1, wherein said oscillator comprises a voltage-controlled oscillator.

7. A method of controlling an optical output level with a channel counter, comprising the steps of:
- transmitting, for each of a plurality of channels, a wavelength multiplexed light signal from an optical fiber to an acousto-optic deflector at a fixed incident angle,
- breaking up said wavelength multiplexed light signal into wavelength components as diffracted light by said acousto-optic deflector,
- receiving a wavelength component as diffracted light with a maximum power by an optical receiver, and
- counting the number of peaks contained in said wavelength component with the maximum power from said optical receiver to count the number of channels.

8. The method according to claim 7, further comprising the step of periodically varying the refractive index of said acousto-optic deflector by applying an ac voltage to said acousto-optic deflector.

9. The method according to claim 7, further comprising the step of satisfying a wavelength component corresponding to each channel contained in said wavelength multiplexed light signal with a Bragg condition so that said optical receiver produces its diffracted light with a maximum power.

* * * * *